United States Patent
Park et al.

(10) Patent No.: US 10,904,766 B2
(45) Date of Patent: Jan. 26, 2021

(54) METHOD OF DETERMINING NODE LOCATION IN COGNITIVE RADIO NETWORK ENVIRONMENT AND NODE LOCATION DETERMINATION DEVICE FOR IMPLEMENTING THE METHOD

(71) Applicant: AGENCY FOR DEFENSE DEVELOPMENT, Daejeon (KR)

(72) Inventors: Sang Cheon Park, Seoul (KR); Young Taek Hong, Seoul (KR); Jee Min Kim, Seoul (KR); Seong Lyun Kim, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/465,319

(22) PCT Filed: Aug. 20, 2018

(86) PCT No.: PCT/KR2018/009494
§ 371 (c)(1),
(2) Date: May 30, 2019

(87) PCT Pub. No.: WO2019/135460
PCT Pub. Date: Jul. 11, 2019

(65) Prior Publication Data
US 2020/0077274 A1    Mar. 5, 2020

(30) Foreign Application Priority Data
Jan. 5, 2018  (KR) .................. 10-2018-0001846

(51) Int. Cl.
*H04W 16/10*   (2009.01)
*H04L 27/00*   (2006.01)
(Continued)

(52) U.S. Cl.
CPC ......... *H04W 16/10* (2013.01); *H04L 27/0006* (2013.01); *H04W 16/14* (2013.01); *H04W 64/003* (2013.01); *H04W 72/0453* (2013.01)

(58) Field of Classification Search
CPC ... H04W 16/10; H04W 16/14; H04W 64/003; H04W 72/0453; H04W 84/005;
(Continued)

(56) References Cited

FOREIGN PATENT DOCUMENTS

| JP | 2014-027611 A | | 2/2014 | |
| JP | 2014-168133 | * | 9/2014 | ............ H04W 16/26 |

(Continued)

OTHER PUBLICATIONS

Junhua Zhu et al., 'Optimal one-dimensional relay placement in cognitive radio networks', IEEE in 2010 International Conference on Wireless Communications & Signal Processing (WCSP), Oct. 23, 2010(https://ieeexplore.ieee.org/document/5633306/).

(Continued)

*Primary Examiner* — Justin T Van Roie
(74) *Attorney, Agent, or Firm* — Novick, Kim & Lee, PLLC; Sang Ho Lee

(57) ABSTRACT

Provided is a method of determining a node location in a cognitive radio network environment in which data is transmitted from a first node to a third node via a second node. The method includes information requesting wherein the first node transmits an information request signal to a plurality of second nodes in a preset segmented region; information receiving wherein the first node receives, from the second nodes, location information and frequency resource information for each second node corresponding to the transmitted information request signal; and segment determining wherein the first node determines one segment in the segmented region based on the received location information and frequency resource information.

2 Claims, 4 Drawing Sheets

(51) Int. Cl.
  *H04W 16/14* (2009.01)
  *H04W 64/00* (2009.01)
  *H04W 72/04* (2009.01)

(58) Field of Classification Search
  CPC ..... H04W 64/006; H04W 88/04; H04W 4/02; H04W 16/18; H04L 27/0006
  See application file for complete search history.

(56) References Cited

FOREIGN PATENT DOCUMENTS

| | | |
|---|---|---|
| JP | 2014-168133 A | 9/2014 |
| KR | 10-1482909 B1 | 1/2015 |
| KR | 10-2017-0138857 A | 12/2017 |

OTHER PUBLICATIONS

International Search Report for PCT Application No. PCT/2018/009494 dated Nov. 28, 2018 (ISA/KR).

* cited by examiner

FIG. 4

| | 28 | 46 | 42 | 52 |
|---|---|---|---|---|
| 31 | 81 | 72 | 82 | 62 |
| 21 | 7 | 52 | 68 | 51 |
| 44 | 13 | 56 | 22 | 39 |
| 88 | 27 | 91 | 82 | |

| A | | | D | |
|---|---|---|---|---|
| | | | C | |
| | | | | F |
| | | | | |
| G | | E | | B |

550  530

METHOD OF DETERMINING NODE LOCATION IN COGNITIVE RADIO NETWORK ENVIRONMENT AND NODE LOCATION DETERMINATION DEVICE FOR IMPLEMENTING THE METHOD

TECHNICAL FIELD

The present disclosure relates to a method of determining a node location in a cognitive radio network environment and a node location determination device for implementing the method, and more particularly, to a method of maximizing a frequency efficiency by properly adjusting locations of a plurality of relay nodes located between a secondary transmitter and a secondary receiver in a cognitive radio network environment and a device for implementing the method.

BACKGROUND ART

Cognitive radio is a radio technology that operates by measuring a radio propagation environment and setting operating parameters of a radio device in accordance with the measured radio propagation environment. For example, technology for maximizing a transmission capacity of a radio device in accordance with channel characteristics, technology for minimizing interference between devices, technology for facilitating interoperability between different types of systems, and technology for finding unused frequencies and making them available to a secondary user when they are not being used by a primary user all belong to a cognitive radio category.

In a conventional cognitive radio network environment, when a receiver receives data from a transmitter through a relay, it is important to increase a frequency efficiency of the entire network to the extent that the frequency efficiency does not interfere with a communication system having priority. In a conventional technology, a location of a relay node between the transmitter and the receiver is fixed. In general, the relay node is located at a location where the relay node can operate most effectively in an operation of initially determining the location of the relay node. However, when the location of the relay node is fixed, the fixed location of the relay node may temporarily not be an optimal location for data transmission.

For example, in an environment where two or more links exist, data transmission may not be performed smoothly due to interference from other terminals.

As another example, when a signal-to-interference ratio (SIR) of a transmitting node and the SIR of a receiving node are different from each other and an actual SIR sensed by the transmitting node is significantly different from an actual SIR sensed by the receiving node, the possibility of a communication failure between the transmitting node and the receiving node increases. The higher the frequency of radio waves, the more straight they travel, like light. Therefore, radio waves are advantageous for transmission in a specific direction and have the advantage of being able to carry a lot of information. However, on rainy or foggy days, there are many water droplets and water vapor in the air, which reduces the transmission accuracy of radio waves. That is, when the transmitting node and the receiving node transmit and receive data via radio waves having a frequency higher than a certain level and a distance between the transmitting node and the receiving node is sufficiently distant, there is a high possibility that communication accuracy between the transmitting node and the receiving node is lowered due to a standby state or the structure of a building.

In order to solve the above problem, it is necessary to minimize the loss or alteration of data when data is transmitted from the transmitting node to the receiving node by placing a relay node between the transmitting node and the receiving node, and there is a need for a technique for actively moving the relay node to a location where a frequency use efficiency of the entire network including the transmitting node and the receiving node can be maximized rather than fixing a location of the relay node.

DESCRIPTION OF EMBODIMENTS

Technical Problem

Provided are a method of determining the location of a mobile relay node in order to minimize the possibility of a communication failure in a process of data transmission through a secondary transmitter, a relay node, and a secondary receiver in a cognitive radio network environment, and a device for implementing the method.

Solution to Problem

According to an aspect of the present disclosure, a method of determining a node location in a cognitive radio network environment in which data is transmitted from a first node to a third node via a second node, includes information requesting wherein the first node transmits an information request signal to a plurality of second nodes in a preset segmented region; information receiving wherein the first node receives, from the second nodes, location information and frequency resource information for each second node corresponding to the transmitted information request signal; and segment determining wherein the first node determines one segment in the segmented region based on the received location information and frequency resource information.

According to an aspect of the present disclosure, a node location determination device included in a first node in a cognitive radio network environment in which data is transmitted from the first node to a third node via a second node, includes an information requester configured to transmit an information request signal to a plurality of second nodes in a preset segmented region; an information receiver configured to receive, from the second nodes, location information and frequency resource information which correspond to the information request signal for each second node; and a segment determinator configured to determine one segment in the segmented region based on the received location information and frequency resource information.

Additional aspects will be set forth in part in the description which follows and, in part, will be apparent from the description, or may be learned by practice of the presented embodiments.

Advantageous Effects of Disclosure

According to the present disclosure, not only location information and frequency resource information of a secondary receiver communicating with a secondary transmitter in a cognitive radio network environment are collected, but also the ease-of-communication in each segment is calculated on the basis of location information and frequency resource information of a plurality of relay nodes located between the secondary transmitter and the secondary receiver, and the relay node is moved to an optimal segment where ease-of-communication is maximized when a current location of the relay node is not in a segment for a maximum communication efficiency. Accordingly, the possibility of a communication failure between the secondary transmitter and the secondary receiver is minimized, and a communication efficiency of the entire network is dramatically increased.

BRIEF DESCRIPTION OF DRAWINGS

FIG. 4 is a view illustrating an example of an ease-of-communication map.

FIG. 5 is a view illustrating a result of moving a second node to an optimal location according to a control signal transmitted from a node location change controller.

BEST MODE

Figure 1A:
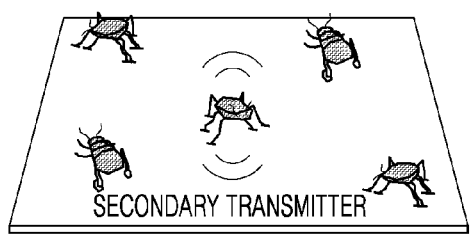
FIGS. 1A-1D are views illustrating a basic operation principle of the present disclosure.

According to an embodiment of the present disclosure, a method of determining a node location in a cognitive radio network environment for transmitting data from a first node to a third node via a second node, the method includes: information requesting wherein the first node transmits an information request signal to a plurality of second nodes in a preset segmented region; information receiving wherein the first node receives location information and frequency resource information for each second node from the second nodes corresponding to the transmitted information request signal; and segment determining wherein the first node determines one segment in the segmented region based on the received location information and frequency resource information.

In the above-described method, the segment determining may include ease-of-communication calculating wherein the first node, based on the received location information and frequency resource information, calculates ease of communication with the first node, of a first region where the second node is located and a second region where the second node is not located in the segmented region; and detailed segment determining wherein the first node determines one segment belonging to the first region or the second region based on the calculated ease of communication.

In the above-described method, the second node is a mobile node and the method may further include node location change controlling in which the second node closest to the determined segment is moved to the determined segment when the determined segment belongs to the second region.

In the above-described method, the location information may be at least two-dimensional coordinates corresponding to each segment belonging to the segmented region.

In the above-described method, the frequency resource information may be a signal-to-interference ratio (SIR) between the second node and the first node.

According to another embodiment of the present disclosure, a node location determination device included in a first node in a cognitive radio network environment for transmitting data from the first node to a third node via a second node, the node location determination device includes: an information requester for transmitting an information request signal to a plurality of second nodes in a preset segmented region; an information receiver for receiving location information and frequency resource information for each second node from the second nodes corresponding to the information request signal; and a segment determinator for determining one segment in the segmented region based on the received location information and frequency resource information.

In the above-described device, the segment determinator may include an ease-of-communication calculator for calculating ease-of-communication of a first region where the second node is located and a second region where the second node is not located, with the first node, in the segmented region, based on the received location information and frequency resource information; and detailed segment determinator for determining one segment belonging to the first region or the second region based on the calculated ease of communication.

In the above-described device, the second node is a mobile node and the device may further include a node location change control unit for moving the second node closest to the determined segment to the determined segment when the determined segment belongs to the second region.

In the above-described device, the location information may be at least two-dimensional coordinates corresponding to each segment belonging to the segmented region.

In the above-described device, the frequency resource information may be an SIR between the second node and the first node.

An embodiment of the present disclosure may provide a non-transitory computer-readable recording medium having recorded thereon a program for executing the method.

Mode of Disclosure

Since the present disclosure may have diverse modified embodiments, preferred embodiments are illustrated in the drawings and are described in the detailed description. An effect and a characteristic of the present disclosure, and a method of accomplishing these will be apparent when referring to embodiments described with reference to the drawings. The present disclosure may, however, be embodied in many different forms and should not be construed as limited to the embodiments set forth herein.

Hereinafter, embodiments will be described in detail with reference to the accompanying drawings. The same reference numerals are used to denote the same elements, and repeated descriptions thereof will be omitted.

It will be understood that although the terms "first", "second", etc. may be used herein to describe various components, these components should not be limited by these terms. These components are only used to distinguish one component from another.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order.

FIGS. 1A-AD are views illustrating a basic operation principle of the present disclosure.

First, referring to FIG. 1A, a secondary transmitter senses a spectrum. The secondary transmitter is an object distinguished from a primary transmitter. In a cognitive radio network, the primary transmitter generates target data to be finally transmitted to the primary receiver, or simply functions as a database storing the target data. The secondary transmitter performs various functions in order to efficiently transmit the target data received from the primary transmitter to the secondary receiver.

Furthermore, in FIG. 1A, the spectrum sensing performed by the secondary transmitter means that the secondary transmitter randomly receives signals emitted by a plurality of nodes forming a cognitive radio network and determines information included in the signals. Signals transmitted by the remaining nodes other than the secondary transmitter may be a response signal to a query signal of the secondary transmitter or, according to an embodiment, may be a signal radiated from each node at regular intervals regardless of the query signal of the secondary transmitter.

Figure 1B:
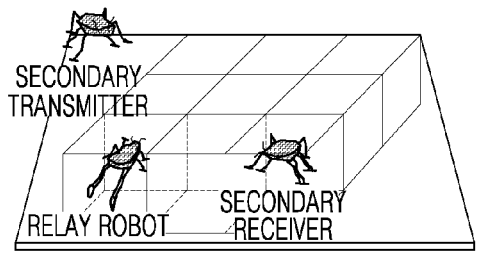

First, referring to FIG. 1B, the secondary transmitter performs a process of matching a plurality of nodes constituting the cognitive radio network to a segmented region in order to determine the next node for target data. Referring to FIG. 1B, it can be seen that the secondary transmitter matches the remaining nodes (a relay robot, the secondary receiver) except for the secondary transmitter to the segmented region divided into nine segments. Here, the secondary transmitter uses location information of the relay robot and the secondary receiver obtained through the sensing of the spectrum performed in the previous operation in order to match the relay robot and the secondary receiver to the segmented region. For example, when the secondary transmitter, the relay robot, and the secondary receiver are located on an identical plane, location coordinates of the relay robot are (4, 2), location coordinates of the secondary receiver are (4, 4), and location coordinates of the secondary transmitter are (1, 1), the location coordinates of the relay robot and the secondary receiver are newly set with the location coordinates of the secondary transmitter as the origin, and the newly set location coordinates may be segment coordinates in the segmented region. That is, in the above example, the segment coordinates of the relay robot are (3, 1) and the segment coordinates of the secondary receiver are (3, 3).

Figure 1C:
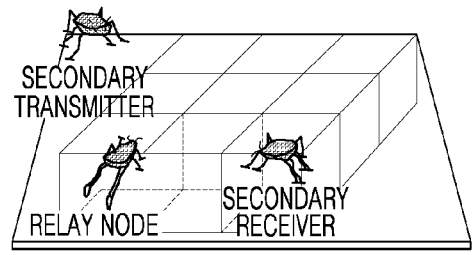
Figure 1D:
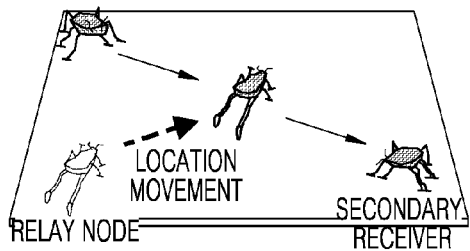

After the secondary transmitter completes the process of matching the plurality of nodes to the segmented region, the secondary transmitter calculates a frequency use opportunity with the relay node excluding the secondary receiver for each segment of the segmented region, as shown in FIG. 1C. Through this process, the frequency use opportunity is calculated for each segment included in the segmented region. After calculating the frequency use opportunity for each segment, as shown in FIG. 1D, the relay node performs location movement to a segment with the highest frequency use opportunity, thereby maximizing communication efficiency between the secondary transmitter and the secondary receiver. The process of calculating the frequency use opportunity will be described in more detail with reference to FIG. 2.

Figure 2:
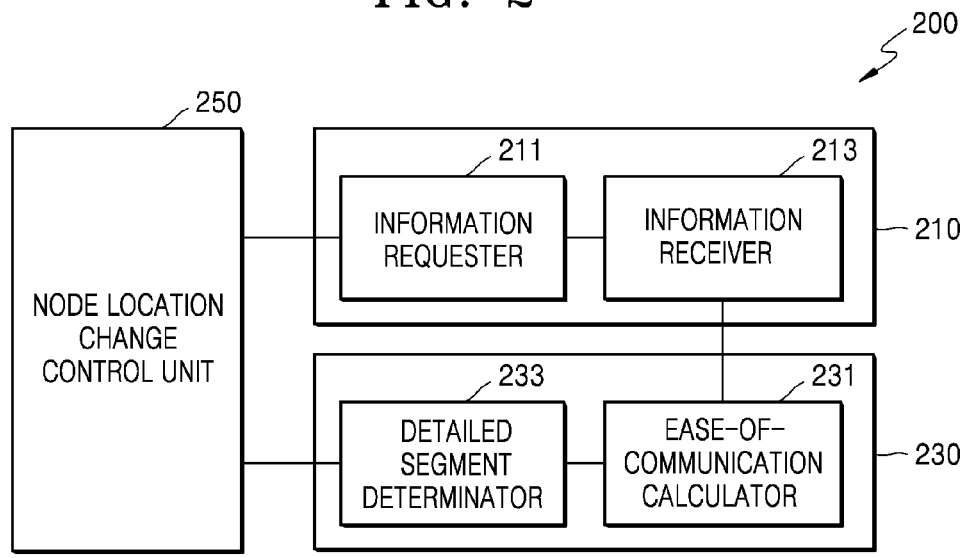
FIG. 2 is a block diagram of an example of a node location determination device in a cognitive radio network environment, according to the present disclosure.

FIG. 2 is a block diagram of an example of a node location determination device in a cognitive radio network environment, according to the present disclosure.

Referring to FIG. 2, a node location determination device 200 in the cognitive radio network environment according to the present disclosure includes a communication unit 210, a segment determinator 230, and a node location change control unit 250. According to an embodiment, the node location change control unit 250 in the node location determination device 200 according to the present disclosure may be omitted and will be described later below with reference to FIGS. 1A-1D for convenience of explanation.

Furthermore, as shown in FIGS. 1A-1D, the cognitive radio network environment according to the present disclosure includes a secondary transmitter (transmitting node), a relay node, and a secondary receiver (a receiving node), and there are a plurality of relay nodes between the secondary transmitter and the secondary receiver. The node location determination device 200 in FIG. 2 may be included in the secondary transmitter in FIGS. 1A-1D, or may be physically or logically connected to the secondary transmitter as an auxiliary device of the secondary transmitter.

Hereinafter, the secondary transmitter is referred to as a first node, the secondary receiver as a third node, and the relay node existing between the secondary transmitter and the secondary receiver as a second node.

First, the communication unit 210 may transmit various information to the remaining nodes except for the secondary transmitter in the cognitive radio network, receive various information from the remaining nodes, and include an information requester 211 and an information receiver 213.

The information requester 211 transmits an information request signal to a plurality of second nodes in a preset segmented region.

As already explained in FIGS. 1A-1D, the segmented region includes the second node and the third node, and depending on the embodiment, the first node may or may not be included in the segmented region. The information requester 211 transmits an information request signal to the plurality of second nodes and determines a second node transmitting a response signal corresponding thereto.

The information receiver 213 receives location information and frequency resource information from the plurality of second nodes that have received the information request signal for each second node. Here, the receiving of the location information and the frequency resource information for each second node means that the received information is not added or processed by any method, but is classified by the number of the second nodes and stored.

The location information transmitted from the second node may be location coordinates of the second node, and the like. For example, three-dimensional coordinates such as [3, 4, 5] may be location information transmitted from the second node, and the second node transmitting the location information is located at corresponding coordinates. The location information transmitted from the second node is not location information about the first node but is absolute coordinates assigned to the second node according to a preset reference. In the present disclosure, since the location information transmitted from the second node is not limited to a specific format, the location information transmitted from the second node may be at least two-dimensional location coordinates.

The frequency resource information transmitted from the second node may be an signal-to-interference ratio (SIR) measured between the second node and the first node based on the second node. The SIR transmitted from the second node is a value in decibels above 1 milliwatt (dBm) and is composed of dBm values for various preset frequencies.

For example, when the frequency resource information transmitted from the second node is [−90, −80, −62] and 850 MHz, 900 MHz, and 2.4 GHz are set as frequencies preset to the first node, an SIR for 850 MHz may be −90 dBm, an SIR for 900 MHz may be −80 dBm, and an SIR for 2.4 GHz may be −62 dBm, based on the second node.

The segment determinator 230 determines one segment in the segmented region based on the location information and the frequency resource information received from the second node. First, the segment determinator 230 determines in which direction and how far away the second node is from the first node through the location information received from the second node. In addition, the segment determinator 230 determines how high the probability of successful communication between the first node and the second node is through the frequency resource information received from the second node. The segment determinator 230 comprehensively considers the location information and the frequency resource information transmitted from the plurality of second nodes and determines one segment in the segmented regions that is closest to the first node and identified as having the highest probability of the most successful communication. The segment determined by the segment determinator 230 may be a segment in which the second node is located, or a segment in which the second node is not located.

When the segment determined in the segmented region by the segment determinator 230 is the segment in which the second node is located, the second node is determined as an optimal relay node, and the first node transmits a target data to be transmitted to the third node to the second node determined as the optimal relay node. When the segment determined in the segmented region by the segment determinator 230 is the segment in which the second node is not located, the segment determinator 230 moves a second node located closest to the segment determined by the segment determinator 230 to a corresponding segment based on the location information transmitted from the plurality of second nodes, thereby maximizing communication efficiency in the cognitive radio network environment.

As an alternative embodiment, the segment determinator 230 may include an ease-of-communication calculator 231 and a detailed segment determinator 233.

First, the ease-of-communication calculator 231, based on the location information and the frequency resource information of the second node, calculates ease-of-communication of a first region where the second node is located and a second region where the second node is not located, with the first node, in the segmented region.

The ease-of-communication calculator 231 will be described in detail with reference to FIGS. 3 to 5.

Figure 3:
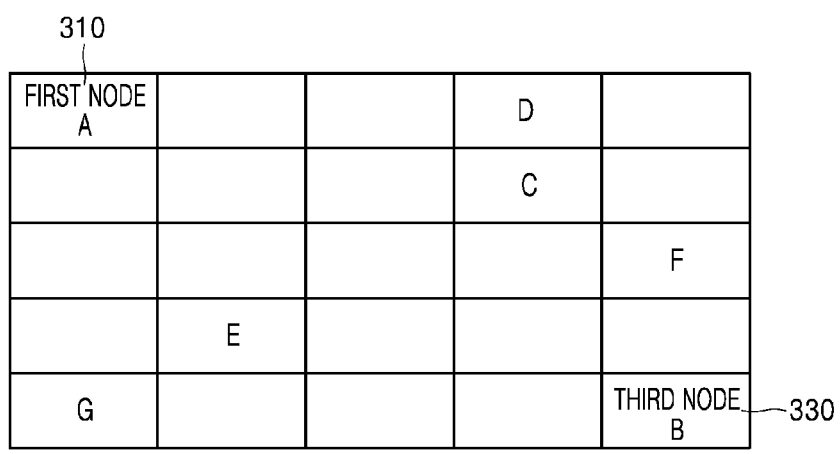
FIG. 3 is a view illustrating an example of a first node to a third node, which are located in a segmented region.

FIG. 3 is a view illustrating an example of a first node to a third node, which are located in a segmented region.

In FIG. 3, the segmented region includes 25 individual segments, and each segment may or may not include a node. A first node A is located in a first segment 310 and a third node B is located in a second segment 330. In addition, each of second nodes C to G is located in one segment, and no node is located in 18 segments.

The ease-of-communication calculator 231 receives location information and frequency resource information from the second nodes C to G. in addition to the location information and the frequency resource information, node index information for respectively distinguishing the second nodes is also transmitted by the second nodes.

TABLE 1

| second node | node index | node location | frequency resource information |
|---|---|---|---|
| C | 3 | {126.976, 37.572} | [−90, −80, −62] |

Table 1 shows an example of information transmitted from the second node in response to an information request signal of the first node. Referring to Table 1, it can be seen that the second node C has transmitted to the first node information having a node index of 3, location information of {126.976, 37.572}, and frequency resource information of [−90, −80, −62]. Based on the information transmitted by the second node C, the ease-of-communication calculator 231 may determine that dBm values of the third node located at {126.976, 37.572} in the segmented region are [−90, −80, −62]. The location information in Table 1 is two-dimensional location coordinates but is not limited thereto. It has already been described that the location information of the second node may be three-dimensional location coordinates according to an embodiment. The ease-of-communication calculator 231 receives the location information and the frequency resource information from a plurality of second nodes, and then calculates an ease-of-communication map for the segmented region. In more detail, the ease-of-communication calculator 231 divides the segmented region into the first region in which second nodes are located and the second region in which the second nodes are not located, and calculates an ease-of-communication map in each region. In FIG. 3, according to the above definition, the first region is regarded as a region for collectively designating the segments in which the second nodes C to G are located, and the second region is regarded as a region for collectively designating the 18 segments excluding the segments in which the first node, the second nodes, and the third node are located.

FIG. 4 is a view illustrating an example of an ease-of-communication map.

FIG. 4 shows a result of calculating the ease-of-communication map by the ease-of-communication calculator 231 based on the first node, the second node, and the third node included in the segmented region and each segment of FIG. 3. Referring to FIG. 4, it can be seen that ease-of-communication for the remaining 23 segments except for the first node for transmitting target data and the third node for receiving the target data through the second nodes is represented by a number for each segment.

Here, the higher an ease-of-communication numerical value of a specific segment is when a second node and a first node in the specific segment communicate with each other, the probability of a communication failure is lowered than when a second node and a first node in another segment communicate with each other.

In FIG. 4, since a segment 410 having the highest ease-of-communication has ease-of-communication of 91 and exhibits higher ease-of-communication than ease-of-communication of the remaining segments, the first node transmits target data to the second node in the segment 410 so that the target data may be transmitted to the third node without any trouble. The ease-of-communication may be calculated based on location information and frequency resource information transmitted by the second node to the first node, and a specific method of calculating the ease-of-communication will be described later below.

The detailed segment determinator 233 determines one segment belonging to a first region or a second region by referring to the ease-of-communication map as shown in FIG. 4. As an example, a segment determined by the detailed segment determinator 233 may be a segment having the highest ease-of-communication in the ease-of-communication map. Referring to FIG. 4, the segment having the ease-of-communication of 91 is determined by the detailed segment determinator 233.

Hereinafter, a specific method for constructing an ease-of-communication map by the ease-of-communication calculator 231 will be described in a time series.

First, the ease-of-communication calculator 231 collects the location information and the frequency resource information from the second node. The location information may be at least two-dimensional location coordinates corresponding to a segment in which the second node exists. The frequency resource information may be a signal-to-interference ratio (in dBm) calculated based on the second node transmitting the location information to the first node.

Based on the location information, the ease-of-communication calculator 231 determines a relative location of the second node in a preset segmented region with respect to the first node. That is, the ease-of-communication calculator 231 determines which segment the second node is located in. When the location of a plurality of second nodes is determined, the sum of segments (the total set of location coordinates) in which the second node exists in the preset segmented region becomes the first region, and the remaining regions are designated as the second region without the second node.

Once the location of the second nodes is determined in the segmented region as described above, the ease-of-communication calculator 231 analyzes frequency resource information for each second node. The frequency resource information, which is state information about a frequency resource of a second node, collectively refers to information derived from frequency characteristic information of a signal transmitted and received when a specific node and the second node communicate with each other.

As an example of the frequency resource information transmitted from the second node, an SIR at the second node may be frequency resource information. When the first node transmits an information request signal by designating various frequencies in advance, the second node calculates the SIR for each of the frequencies included in the information request signal, and transmits the calculated SIR to the first node by including the calculated SIR in the response signal.

For example, when the frequency resource information transmitted from the second node is [−90, −80, −62] and 850 MHz, 900 MHz, and 2.4 GHz are set as frequencies preset to the information request signal of the first node, an SIR for 850 MHz may be −90 dBm, an SIR for 900 MHz may be −80 dBm, and an SIR for 2.4 GHz may be −62 dBm, based on the second node.

Next, the ease-of-communication calculator 231 calculates an SIR based on the first node and multiplies the SIR by the SIR of the second node, thereby calculating ease-of-communication in the segment in which the second node is located. For example, if 850 MHz, 900 MHz, and 2.4 GHz are set as preset frequencies in the information request signal of the first node, SIRs of the first node at a preset frequency are [−40, −30, −80], and SIRs of the second node are [−90, −80, −62], the ease-of-communication is calculated as matrix information such as [3600, 2400, 4960] when the SIRs are multiplied by the same frequencies. The ease-of-communication is the highest when the frequency is 2.4 GHz. Therefore, a communication failure rate may be lowered by setting a frequency of the first node to 2.4 GHz when the first node and the second node communicate with each other. Through the above-described method, the ease-of-communication calculator 231 may calculate ease-of-communication of the first region.

The ease-of-communication calculator 231 calculates ease-of-communication of the second region as well as the ease-of-communication of the first region based on the location information and the frequency resource information of the second node as described above. Since the second region is a region including segments in which the second node is not located, the SIR of the second node cannot be utilized. The ease-of-communication calculator 231 calculates a frequency use opportunity based on the location information and the frequency resource information of each of the first node and the second node.

Here, the frequency use opportunity refers to information that is based on the SIR of the second node calculated on the assumption that the second node is located in a corresponding segment but the second node is not actually located in the corresponding segment. Through a number of iterative experiments, the frequency use opportunity is calculated to be substantially the same as the SIR of the second node. From this, the ease-of-communication calculator 231 may obtain result information that is very similar to information that the second node is located in the corresponding segment.

$$\theta^* = \max\left[\overline{\theta}, \underset{\theta}{\mathrm{argmax}} \int_{x>0}\int_{r>0} P_s(r, \theta) \int_{\theta>0} P_s(r, e^\theta - 1)\exp(-\pi\lambda_2 \hat{\phi}_2^{\frac{2}{\alpha}} d^2 \rho_0(e^\theta - 1))d\theta f_r(r)f_r(x)drdx\right]$$ [Equation 1]

$$\overline{\theta}\lambda_2 \hat{\phi}_2 P_1^{\frac{2}{\alpha}} \rho_0(\overline{\theta})(1 - \tau) = \lambda_1 P_2^{\frac{2}{\alpha}} (\tau + \rho(\overline{\theta})\tau - \rho(\overline{\theta}))$$ [Equation 2]

Equations 1 and 2 are examples of equations for calculating a frequency use opportunity. In particular, Equation (2) is an equation defining $\overline{\theta}$, which is an optimal access threshold. In Equation (1), $\theta$, which is an optimal SIR reference value that can maximize a network efficiency, is a value preset in the ease-of-communication calculator 231. $\lambda_1$ denotes the density of a primary transmitter, $\lambda_2$ denotes the density of a secondary transmitter (first node), $P_1$ denotes a transmission power of the primary transmitter, $P_2$ denotes a transmission power of the secondary transmitter (first node), $\theta$ denotes an SIR of the first node, d denotes a distance between the first node and the third node, $P_s$ denotes a frequency use opportunity, r denotes a distance from the first node to the nearest primary transmitter, a denotes path loss, and $\hat{\Phi}_2$ denotes average access probability.

$$P_s(r, \theta) = \frac{1}{2\pi} \int_0^{2\pi} \frac{P_2}{P_2 + P_1 \theta d^a (r^2 - 2xr\cos(t) + x^2)^{-\frac{a}{2}}}$$

$$dt * \exp\left(-\lambda_1 \left[ \int_{r+x}^{\infty} \frac{2\pi P_1 \theta d^a y^{-a+1}}{P_2 + P_1 \theta d^a y^{-a}} dy + \right.\right.$$

$$\int_{|r-x|}^{r+x} \frac{2a\cos\left(\frac{r^2 - x^2 - y^2}{2xy}\right) d^a y^{-a+1}}{P_2 + P_1 \theta d^a y^{-a}} dy +$$

$$\left.\left. \int_{r+x}^{|r-x|} \frac{2\pi P_1 \theta d^a y^{-a+1}}{P_2 + P_1 \theta d^a y^{-a}} dy \right]\right)$$

[Equation 3]

$$\rho_0(\theta) = \theta^{\frac{2}{a}} \int_0^{\infty} \frac{du}{1 + u^{\frac{a}{2}}}$$ [Equation 4]

$$\rho(\theta) = \frac{2\pi}{a} \csc\left(\frac{2\pi}{a}\theta\right)$$ [Equation 5]

$$f_r(r) = 2\pi\lambda_1 r e^{-\pi\lambda_1 r^2}$$ [Equation 6]

$$\Phi_2 = \int_{x>0} \int_{r>0} P_s(r, \theta) f_r(r) f_r(x) dr dx$$ [Equation 7]

Equations 3 to 7 are for calculating values used as coefficients or constants in equations 1 and 2.

In equations 3 to 7, τ is a condition for guaranteeing the performance of a primary network, which denotes an outage probability. $f_r$ denotes a probability density function for a probability that there is no node in the distance r and is empty. $\rho_0$ and $\rho$ denote substitution equations for calculating $\hat{\theta}$ by easily arranging the mathematical expression in equation 2.

Each coefficient or unknown used in equations 1 to 7 may be obtained in a communication process of a secondary transmitter, a plurality of relay nodes, and a secondary reception period in a cognitive radio network environment.

The ease-of-communication calculator 231 may calculate a frequency use opportunity in each segment of the second region and then multiply the frequency use opportunity by the SIR of the first node to calculate the ease-of-communication of each segment of the second region as shown in FIG. 4.

$$T = SIR_1 * OP_2$$ [Equation 8]

Equation 8 is an example of equations for calculating the ease-of-communication in each segment of the second region by the ease-of-communication calculator 231. In equation 8, $SIR_1$ is an SIR based on the first node, $OP_2$ is a frequency use opportunity in each segment, and when the second node is located in the corresponding segment, $SIR_1$ may be an SIR calculated based on the second node. That is, the ease-of-communication for each segment of the first region in which the second node is located may be calculated by multiplying SIRs based on the first node and the second node, respectively. The ease-of-communication for each segment of the second region in which the second node is not located may be calculated by multiplying the frequency use opportunity calculated by Equations 1 to 6 by the SIR of the first node. As shown in FIG. 4, a map obtained by numerically expressing the ease-of-communication for each segment of the segmented region may be referred to as an ease-of-communication map or an opportunity map (OP Map).

The detailed segment determinator 233 determines one segment belonging to the first region or the second region by referring to the ease-of-communication map. The segment determined by the detailed segment determinator 233 is a segment having the best condition for performing communication with the first node in consideration of location information and frequency resource information. When the segment determined by the detailed segment determinator 233 belongs to the first region, the second node is already located in the segment, and when the segment determined by the detailed segment determinator 233 belongs to the second region, the second node is not located in the segment.

As an alternative embodiment, the detailed segment determinator 233 may refer to the ease-of-communication map and may not determine segments when ease-of-communication values of respective segments in the ease-of-communication map do not exceed a preset reference value. In the alternative embodiment, the detailed segment determinator 233 refers to the ease-of-communication map calculated by the ease-of-communication calculator 231 and does not determine segments by determining that the entire communication environment is in an extremely bad state when none of the ease-of-communication values exceeding the preset reference value is found. Accordingly, the first node does not perform communication until the detailed segment determinator 233 determines an optimal segment after a lapse of time. According to the alternative embodiment, it is possible to prevent unnecessarily inefficient communication, thereby increasing communication efficiency of the entire network and preventing the first node from wasting transmission energy unnecessarily.

As another alternative embodiment, when the segment determined by the detailed segment determinator 233 belongs to the second region, the node location change control unit 250 controls the second node to move to the segment determined by the detailed segment determinator 233. In more detail, in the alternative embodiment, the second node is characterized in that the second node receives a control signal transmitted by the node location change control unit 250 and moves according to a command included in the control signal.

FIG. 5 is a view illustrating a result of moving a second node to an optimal location according to a control signal transmitted from a node location change control unit.

FIG. 5, which is a view derived from the results of FIG. 3 and FIG. 4, shows a result of the second node receiving a control signal transmitted by the node location change control unit 250 and moving to an optimal segment when the detailed segment determinator 233 determines the optimal segment in which the second node needs to be located so that the first node and the second node may communicate with each other most efficiently but the second node is not located in the optimal segment because the corresponding segment belongs to the second region instead of the first region.

Referring to FIG. 5 with reference to FIGS. 3 and 4, when the detailed segment determinator 233 determines the optimal segment according to the ease-of-communication map of FIG. 4 as a segment having location coordinates [5, 3], the second node located in the segment whose location coordinates are [4, 2] receives the control signal of the node location change control unit 250 and moves to the segment whose location coordinates are [5, 3] according to the control signal.

In this process, the node location change control unit 250 may transmit control signals to all of the second nodes C to G or may transmit control signals only to the second node E close to an optimal segment 550 from among the plurality of second nodes. In the former case, since the control signals transmitted by the node location change control unit 250 only needs to include location coordinates of the optimal segment 550, computational throughput of the node location determination device 200 according to the present disclosure including the node location change control unit 250 may be minimized and the second node E moves to the optimal segment 550 through communication between the plurality of second nodes receiving the control signals. In the latter case, the node location change control unit 250 may determine the second node E closest to the optimal segment based on location information and transmit the control signals only to the second node E so that it is not necessary for the node location change control unit 250 to include a processor for performing a complicated operation on the plurality of second nodes in order to locate the second nodes in the optimal segment 550 as in the former case.

As shown in FIG. 5, when the second node E is located in the optimal segment 550, the first node A transmits target data to the second node E, and the second node E receives the target data to transmit the target data to the third node E.

As described above, according to the present disclosure, since data is transmitted from the first node A to the third node B through the second node E located in the optimal segment 550, the possibility of a communication failure is minimized, and a communication efficiency of the entire network is dramatically increased. As a technical configuration for generating the above effect, the present disclosure includes a configuration for not only collecting location information and frequency resource information of the second node communicating with the first node but also calculating ease-of-communication in the segment in which the second node is not located based on the location information and the frequency resource information of the second node, and for moving the second node to an optimal segment where ease-of-communication is maximized when a current location of the second node is not located in a segment for ensuring the maximum communication efficiency.

As another alternative embodiment of the present disclosure, the ease-of-communication calculator 231 may determine the optimal segment of the second node by not only calculating an ease-of-communication map based on the first node but also further calculating an ease-of-communication map for the plurality of second nodes and by referring to the calculated two ease-of-communication maps. In the alternative embodiment, equations 1 to 7 described above are basically utilized. The respective ease-of-communication maps are calculated based on the location information and the frequency resource information of the plurality of second nodes and the third node instead of using the location information and the frequency resource information of the first node and the plurality of second nodes, and the optimal segment of the second node is determined based on the calculated ease of communication maps.

For example, it is assumed that the first node A, the second nodes C and D, and the third node B are included in the segmented region, and the detailed segment determinator 233 determines C as the second node for communicating with A from among the two second nodes according to an ease-of-communication map 1 calculated by the ease-of-communication calculator 231. In such a case, data needs to be transmitted from A to B via C according to the embodiment. However, when a communication efficiency for transmitting data from D to B is very high unlike in the ease-of-communication map 1, transmitting data from A to B via D may be a way to increase a communication efficiency of the entire network.

That is, the ease-of-communication calculator 231 calculates the ease-of-communication map 1 for the second node with reference to the first node, calculates the ease-of-communication map 2 for the second node C and the third node B, calculates the ease-of-communication map 3 for the third node B, and finally calculates the ease-of-communication map 4 obtained by integrating the ease-of-communication map 1 and the ease-of-communication map 2 and the ease-of-communication map 5 obtained by integrating the ease-of-communication map 5 so that the segment determinator 233 may determine a segment to which the second node needs to move. As described above, in the alternative embodiment, equations 1 to 8 may be used to calculate several ease-of-communication maps.

Figure 6:
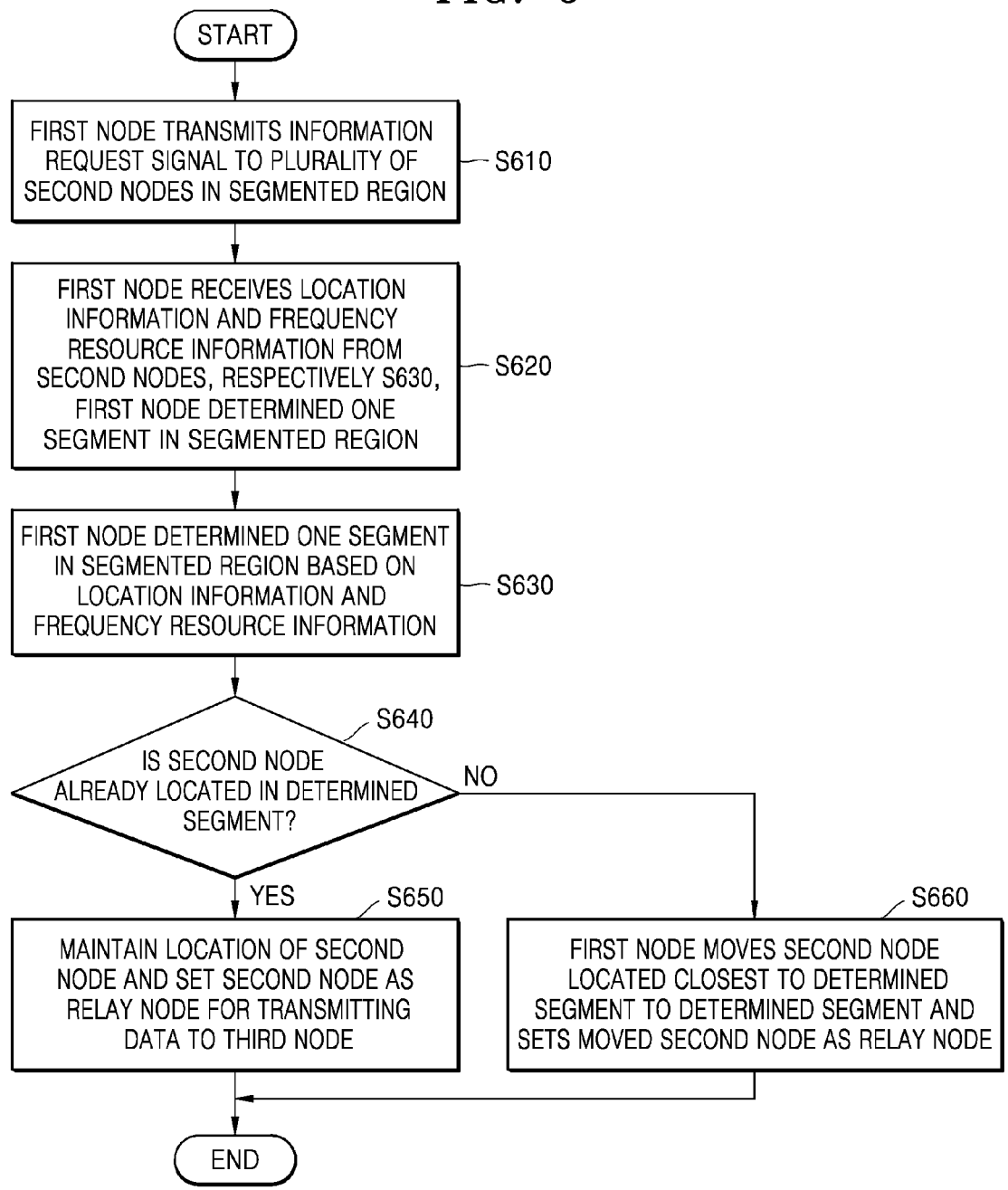
FIG. 6 is a flowchart illustrating an example of a method of determining a node location in a cognitive radio network environment, according to the present disclosure.

FIG. 6 is a flowchart illustrating an example of a method of determining a node location in a cognitive radio network environment, according to the present disclosure.

Since the method according to FIG. 6 may be implemented by the node location determination device 200 described with reference to FIG. 2, repeated descriptions thereof will not be given herein. Furthermore, the node location determination device 200 of FIG. 2 has been already described as being included in the first node or connected to the first node through wired/wireless communication. Thus, the node location determination device 200 will be described with reference to FIG. 2 for convenience of explanation.

In operation S610, the first node transmits an information request signal to the plurality of second nodes in the segmented region.

In operation S620, the first node receives location information and frequency resource information from the second nodes, respectively.

In operation S630, the first node determines one segment in the segmented region based on the location information and the frequency resource information. Next, in operation S640, the first node determines whether the second node is already located in the segment determined in operation S630.

In operation S650, when the second node is already located in the segment determined in operation S630, the first node maintains the location of the second node and sets the second node as a relay node for transmitting data to the third node.

In operation S660, when the second node is not located in the segment determined in operation S630, the first node moves the second node located closest to the determined segment to the segment determined in operation S630 and sets the moved second node as a relay node.

The first node performs a function of transmitting target data to the relay node set in operation S650 or S660 and controlling the target data to be transmitted to the third node through the above operations. According to the present disclosure as described above, the first node may control communication between nodes by maximizing a frequency efficiency of the entire network in a cognitive radio network environment.

As described above, the first node is a secondary transmitter for receiving data generated in a primary transmitter for the first time in the cognitive radio network, and the third node is a secondary receiver for finally transmitting data to a primary receiver. In the first node, information such as location information, frequency resource information, power, and the like for the primary transmitter and the primary receiver necessary for calculating the ease-of-communication by equations 1 to 8 are stored in advance.

The above-described embodiments according to the present disclosure may be implemented in the form of a computer program that can be executed by various components on a computer, and such a computer program may be recorded on a computer-readable medium. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program instructions such as a ROM, a random-access memory (RAM), or a flash memory.

Meanwhile, program instructions recorded on the medium may be particularly designed and structured for the present disclosure or available to those skilled in computer software. Examples of the program commands may include advanced language codes that can be executed by a computer by using an interpreter or the like as well as machine language codes made by a compiler.

The particular implementations shown and described herein are examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical."

The use of the terms "a", "an", and "the" and similar referents in the context of describing the present disclosure (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of the disclosure unless otherwise claimed. Numerous modifications and adaptations will be readily apparent to one of ordinary skill in the art without departing from the spirit and scope of the present disclosure.

INDUSTRIAL APPLICABILITY

The present disclosure may be utilized to determine the location of a plurality of nodes in a cognitive radio network environment.

The invention claimed is:

1. A method of determining a node location in a cognitive radio network environment in which data is transmitted from a first node to a third node via a second node, the method comprising:
    information requesting wherein the first node transmits an information request signal to a plurality of second nodes in a preset segmented region;
    information receiving wherein the first node receives, from the plurality of second nodes, location information and frequency resource information for each second node corresponding to the transmitted information request signal; and
    segment determining wherein the first node determines one segment in the segmented region based on the received location information and frequency resource information,
    wherein the segment determining comprises:
    ease-of-communication calculating wherein the first node, based on the received location information and frequency resource information, calculates ease-of-communication with the first node in a first region where the second node is located and in a second region where the second node is not located, in the segmented region; and
    segment determining wherein the first node determines the one segment belonging to the first region or the second region based on the calculated ease-of-communication,
    wherein the ease-of-communication with the first node in the first region is calculated by multiplying a signal-to-interference ratio based on the first node and a signal-to-interference ratio based on the second node located in the first region,
    wherein the ease-of-communication with the first node in the second region is calculated by multiplying the signal-to-interference ratio based on the first node and a frequency use opportunity in the second region, and
    wherein the frequency use opportunity is calculated based on a distance between the first node and the third node, and a transmission power of the first node.

2. A node location determination device included in a first node in a cognitive radio network environment in which data is transmitted from the first node to a third node via a second node, the node location determination device comprising:
    an information requester configured to transmit an information request signal to a plurality of second nodes in a preset segmented region;
    an information receiver configured to receive, from the plurality of second nodes, location information and frequency resource information which correspond to the information request signal for each second node; and
    a segment determinator configured to determine one segment in the segmented region based on the received location information and frequency resource information,
    wherein the segment determinator comprises:
    an ease-of-communication calculator configured to calculate, based on the received location information and frequency resource information, ease-of-communication with the first node in a first region where the second node is located and in a second region where the second node is not located, in the segmented region; and the segment determinator configured to determine the one segment belonging to the first region or the second region based on the calculated ease-of-communication, wherein the ease-of-communication with the first node in the first region is calculated by multiplying a signal-to-interference ratio based on the first node and a signal-to-interference ratio based on the second node located in the first region, wherein the ease-of-communication with the first node in the second region is calculated by multiplying the signal-to-interference ratio based on the first node and a frequency use opportunity in the second region, wherein the frequency use opportunity is calculated based on a distance between the first node and the third node, and a transmission power of the first node.

* * * * *